United States Patent Office 2,861,997
Patented Nov. 25, 1958

2,861,997

STABILIZATION OF METHYL, VINYL PYRIDINE

Paul F. Warner, Phillips, Tex., assignor to Phillips Petroleum Company, a corporation of Delaware No Drawing. Application August 18, 1952
Serial No. 305,067

1 Claim. (Cl. 260—290)

This invention also pertains to the stabilization of vinyl-substituted heterocyclic nitrogen compounds. In one of its aspects the invention pertains to the purification of vinylpyridine compounds. In another of its aspects the invention relates to stabilization during purification of alkyl-substituted vinylpyridine.

It is known that difficulties are encountered in the manufacture of vinylpyridine compounds because of the tendency of these heterocyclic nitrogen compounds to polymerize upon exposure to elevated temperatures. For example difficulty is generally encountered in purifying vinylpyridine compounds by distillation due to their susceptibility to polymerization which results in the formation of an insoluble polymer within the column. In order to overcome this difficulty it is necessary to operate at low temperatures under high vacuum or in some way stabilize these pyridines against polymerization during distillation.

In accordance with an aspect of this invention it is proposed to add an inhibiting agent or stabilizer and carry out a fractional distillation of an organic mixture containing a substantial proportion of at least one vinyl-substituted heterocyclic nitrogen compound in the presence of this stabilizer to inhibit or prevent polymer formation. I have found that if an organic polysulfide of the type disclosed herein is present during distillation polymer formation is thereby inhibited. The organic polysulfide is used to inhibit polymerization while closely boiling compounds are distilled to remove one or more vinyl-substituted heterocyclic nitrogen compounds. By further treatment, the organic polysulfide can be removed if desired. Thus in the practice of an embodiment of this invention a continuous process is provided for inhibiting the formation of insoluble polymer in a fractionation zone in which vinylpyridine compounds are being fractionated. The separation of vinylpyridine compounds from a mixture is effected in the presence of an organic polysulfide of the type disclosed herein.

Organic polysulfides employed in accordance with this invention are of the type $R'S_xR''$ wherein $R'$ and $R''$ represent the same or different organic radicals and $x$ is an integer from 3 to 5 representing the number of sulfur atoms. I prefer polysulfides wherein each R is an alkyl radical having from 1 to 12 carbon atoms in the alkyl substituent, and particularly mixtures of alkyl tetrasulfides and alkyl pentasulfides. Desirable polysulfides are mixtures of ditertiarybutyl polysulfides containing mostly four or five sulfur atoms per molecule, and mixtures of ditertiarydodecyl tetrasulfide and ditertiarydodecyl pentasulfide. However, other polysulfides are those wherein R is an aryl, alkyl, acyl, thioacyl, carbamyl, thiocarbamyl, thiazyl or substituted thiazyl radical. Aminoalkyl, nitroalkyl, aralkyl, chloroalkyl, alkenyl, furyl, tetrahydrofuryl, pyridyl, quinolyl, pyranyl, and indolyl are included. Others are di-2-ethyl hexyl pentasulfide, didodecyl tetrasulfide, benzothiazyl-2-o-nitrophenyl trisulfide, difuroyl tetrasulfide, dicyclohexyl pentasulfide, di-o-tolyl trisulfide, bis-(4-phenyl thiazyl-2) trisulfide, didodecyl pentasulfide, and dibutyl pentasulfide.

The process of this invention is applicable to organic or heterocyclic mixtures containing a substantial proportion of vinyl-substituted heterocyclic nitrogen compounds, i. e. that amount which causes difficulty during distillation, say from 70 percent to 99 percent by weight of vinyl compound. However, whenever a mixture containing a major, and sometimes a lesser, amount of a vinyl-substituted heterocyclic nitrogen compound is distilled it is desirable to employ the inhibitor of this invention. Preferred polymerizable heterocyclic nitrogen compounds which can be stabilized in accordance with my invention are the mono- and di-vinylpyridines, with the vinyl group being present in any of the several positions in the pyridine nucleus. Alkyl groups can be present on the ring or on the alpha carbon atom of the vinyl group, but the number of carbon atoms in the combined alkyl groups should generally not be greater than 12. These alkyl groups are preferably methyl and ethyl groups. Substituents to be attached to carbon atoms in the pyridine ring can be selected from the group consisting of hydrogen, alkyl, vinyl, and isopropenyl (alpha-methylvinyl) groups; at least one and not more than two of said groups being vinyl or alpha-methylvinyl; and the total number of carbon atoms in the alkyl groups being not greater than 12. Examples of such compounds are 2-vinylpyridine; 3 - vinylpyridine; 4 - vinylpyridine; 2,5 - divinylpyridine; 2 - methyl - 5 - vinylpyridine; 2 - vinyl - 5 - ethyl pyridine; 2,3,4 tri-methyl-5-vinylpyridine; 3,4,5,6-tetramethyl-2-vinylpyridine; 3-ethyl-5-vinylpyridine; 2,6-diethyl-4-vinylpyridine; 2-iso-propyl-4-nonyl - 5 - vinylpyridine; 2-methyl-5-undecyl-3-vinyl-pyridine; 3-dodecyl-4,5-divinylpyridine; 2,4 - dimethyl - 5,6 - dipentyl - 3 - vinylpyridine; 2 - decyl - 5 - (alpha - methylvinyl) pyridines; 3,5-di (alpha-methylvinyl) pyridine; and the like.

Those skilled in the art will appreciate that for the purpose of this invention compounds of the above nature substituted with non-interfering groups, for example halo, nitro, amino-, hydroxyl-, and carboxyl-, are the same as those compounds listed.

Other polymerizable heterocyclic nitrogen compounds within the scope of this invention include those vinyl and alpha-methylvinyl substituted heterocyclic nitrogen compounds in which the ring structure is unsaturated, partially saturated and completely saturated. Examples include vinyl and alpha-methylvinyl substituted quinolines, isoquinolines, piperidines (hexa-hydropyridines), pyrroles, pyrrolidines, pyrrolidones, especially the vinyl-substituted pyrrolidones, piperidines, pyrroles, pyrrolidines, quinolines, isoquinolines, and alkyl derivatives of the foregoing compounds, dihydro and tetrahydropyridines, partially hydrogenated quinolines and isoquinolines, and pyrrolines (dihydro pyrroles). Examples of such compounds are 2-vinylquinolines; 8-ethyl-2-vinylquinoline; 4 - hexyl - 5 - vinylquinoline; 1 - vinylisoquinoline; 5 - methyl - 1 - isopropenylisoquinoline; 1,8-divinylisoquinoline; and the like. Normally the vinyl substituent will be attached to a ring carbon atom. However, in compounds containing a secondary ring nitrogen atom the vinyl group can instead be attached to this ring nitrogen atom, for example in N-vinylcarbazole and N-vinylpyrrolidone.

As indicated the process of this invention is applicable to mixtures of heterocyclic nitrogen compounds containing a substantial proportion of a vinylpyridine compound. By a vinylpyridine compound I mean vinylpyridine and vinylpyridines having other substituents as mentioned hereinbefore, particularly 2-vinyl-4,6-dimethylpyridine, 2-methyl-4-vinylpyridine, 2-methyl-5-vinylpyridine, 5-ethyl-2-vinylpyridine, 5-amyl-2-vinylpyridine. These compounds can be prepared by dehydrogenation. Long chain alkyl vinylpyridines, on the other hand, can be prepared by treating alkylpyridines having a methyl group in the 2 or 4 position, i. e. a reactive methyl group with an aldehyde so that the aldehyde and the methyl group combine and then splitting off a molecule of water to form the vinyl group.

In the preparation of 2-methyl-5-vinylpyridine from 2-methyl-5-ethylpyridine by dehydrogenation the principal separation is a combined stream and vacuum distillation to make a separation between 2-methyl-5-ethylpyridine and 2-methyl-5-vinylpyridine. This separation is difficult because of the rapid polymerization of 2-methyl-5-vinylpyridine. After a short period of time operation of the column becomes impossible because of an insoluble polymer which forms in the lower part of the fractionating column and in the kettle. However, by the use of polysulfides in accordance with this invention shutdowns due to the formation of insoluble polymer are largely eliminated. I have found that when the object is merely to stabilize the distilland by the inhibition of insoluble polymer formation the polysulfide can be employed in the lowest proportion which will desirably inhibit the formation of insoluble polymer. For such purpose the feed to the distillation column is preferably treated with from 0.1 to 0.5 percent based on the vinyl-substituted heterocyclic nitrogen compound. In many instances when the concentration of the polysulfide is greater than 0.5 percent by weight based on the vinyl-substituted heterocyclic nitrogen compound, say 0.5 to 5 percent by weight, the formation of soluble polymer is inhibited during distillation as well as the formation of insoluble polymer.

In practicing the invention, for example in the separation of 2-methyl-5-vinylpyridine from 2-methyl-5-ethylpyridine and the lighter material, the mixture can be distilled in a combined steam-vacuum unit operated with a top power pressure of 100 millimeters mercury absolute. Sufficient steam is added to the unit to maintain a temperature of 185° F. in the reboiler. The 2-methyl-5-vinylpyridine and the polysufide are withdrawn at the bottom of the unit. These can be stored or the polysufide removed if desired and then the product stored.

One method of operation is to take the vinylpyridine product from storage and subject it to a final fractionation to recover at least 95 percent pure methylvinylpyridine as overhead product. In this column insoluble polymer formation has been particularly troublesome prior to the use of this invention.

The following examples will serve to illustrate the preparation of alkyl polysulfide and desirability of carrying out the final distillation in accordance with this invention. The example is for the purposes of illustration only and is in no sense limitative of the invention.

*Example I*

Sulfur was reacted with ditertiarybutyl disulfide in a ratio of three mols per mol of ditertiarybutyl disulfide. The reaction was carried out at a temperature of from 300° F. to 310° F. for 24 hours using 0.5 percent by weight, based on the charge, of $P_2S_5$ as a catalyst. A mixture of ditertiarybutyl polysulfides resulted. This mixture of polysulfides, believed to contain a large amount of polysulfides with four or five sulfur atoms per molecule, was used in Example II.

*Example II*

In a plant employed in the separation of organic compounds commercially one column has for some time been employed in the final fractionation of 2-methyl-5-vinylpyridine, which involves the separation of 2-methyl-5-ethylpyridine from 2-methyl-5-vinylpyridine as disclosed hereinbefore. The column frequently had to be shut down because it became plugged with insoluble polymer. The following tabulation shows how the column operated when the vinylpyridine mixture was stabilized in accordance with this invention using tertiarybutylpolysulfide. The feed to the fractionator contained from 90 to 95 percent by weight 2-methyl-5-vinylpyridine. For the purposes of comparison sulfur, phenyl naphthylamine and sodium polysulfide were also used. Ditertiarybutyl polysulfide was prepared as in Example I, and sodium polysulfide by reacting sodium sulfide with free sulfur in a concentrated aqueous solution of NaOH at 160° F. The feed stream contained from 90 percent to 95 percent of the vinylpyridine by weight.

| Inhibitor | Percent by weight of vinylpyridine | Operating Time, Hours |
|---|---|---|
| Sulfur | 0.2 | 11. |
| Phenyl beta naphthylamine | 0.2 | 11. |
| Sodium polysulfide | 0.2 | 11. |
| Ditertiarybutyl polysulfide | 0.2 | 144 (Shut down for lack of feed). |

*Example III*

A ditertiarydodecyl polysulfide was prepared in accordance with Example I and employed in the column employed commercially in accordance with Example II. The column was operated for 48 hours and no insoluble polymer was formed. The didodecyl polysulfide was found to be as effective as the ditertiarybutyl polysulfide.

*Example IV*

This example illustrates how the invention is applied to the main fractionation step wherein dehydrogenation products from a 2-methyl-5-ethylpyridine catalytic-steam dehydrogenation process are fractionated. The fractionator employed is a 120 tray combined steam-vacuum unit operated with a top pressure of 100 millimeters mercury absolute and a reboiler temperature of 185° F. The composition of the feed stream to the fractionator is as follows:

| Component: | Weight percent |
|---|---|
| $CO_2$ | .05 to 0.8 |
| 2-picoline | 1.55 to 1.80 |
| 3-picoline | 1.45 to 1.60 |
| 4-picoline | .05 to .07 |
| 2,5-dimethylpyridine | 1.70 to 1.90 |
| 3-vinylpyridine | 1.00 to 3.00 |
| 2-methyl-5-ethylpyridine | 43.00 to 68.00 |
| 2-methyl-5-vinylpyridine | 15.00 to 28.00 |
| High boiling pyridines | .40 to .45 |
| Polymerized material | .08 to .15 |
| Heavy oil | .20 to .28 |
| Water | 10.00 to 25.00 |

Prior to its introduction into the fractionation column the feed stream is mixed with 0.5 percent by weight of a ditertiarybutylpolysulfide composition prepared according to Example I. Distillation difficulties due to insoluble polymer formation are eliminated. The top product comprises 2-methyl-5-ethylpyridine and lighter products while the bottoms contains 2-methyl-5-vinylpyridine, polysulfide inhibitor and not more than 15 percent impurities.

Above Examples II and III and IV clearly show the marked increase in operating time resulting from operation in accordance with my invention. When sulfur and the other two compounds were employed the column became plugged with insoluble solid polymer and had to be shut down after 11 hours. However, when ditertiarybutyl polysulfide was used the column was operated for 144 hours and then shut down only because of lack of feed. The product is in readily polymerizable form, i. e. sufficiently pure, except that it may contain inhibitor, for use as monomeric material in polymerization processes.

The organic polysulfide is desirably introduced into the bottom of the column, but it can be fed into the side with the feed, when operating with sufficient reflux, e. g. reflux to product ratio of 2 to 1. This latter method is convenient when feed contains the polysulfide, as in the final fractionation step.

As mentioned hereinbefore in many instances the formation of soluble polymer, as well as insoluble polymer which plugs the column, will be inhibited by the use of more than 0.5 weight percent of the organic polysulfide based on the weight of the vinyl compound. However, particularly during the final fractionation, i. e. after the separation of 2-methyl-5-vinylpyridine from 2-methyl-5-ethylpyridine, if the polysulfide is pumped into the top of the fractionation column soluble polymer is thereafter encountered. Both the column and the kettle are protected from insoluble polymer during this distillation but the product contains traces of sulfur compounds originating from polysulfide. These impurities which are carried over with the product act as promoters for soluble polymer formation, as determined by a hexane dilution test. Dilution with hexane of product containing soluble polymer yields a white precipitate. In this case it will be desirable to combine the organic polysulfide with another compound which inhibits the formation of soluble polymer. I have found that when tertiary butyl catechol is used in conjunction with the organic polysulfide the formation of soluble polymer due to sulful compounds in the overhead products is prevented. However, other inhibitors, e. g. phenyl beta naphthylamine, catechol and other alkyl catechols can also be mentioned. As indicated from 0.1 to 5 percent by weight, based on the vinyl-substituted heterocyclic nitrogen compound, of the organic polysulfide is used. The amount of the catechol or other inhibitor can be conveniently based on the polysulfide. Normally the ratio of polysulfide to the catechol is from 4:1 to 1:1, by weight.

The use of catechol in combination with the organic polysulfide can be conveniently illustrated by the following example.

*Example V*

In this example a final fractionation of 2-methyl-5-vinylpyridine was carried out in a column employed commercially as in Example II. Ditertiarybutyl polysulfide was fed to the column at its midpoint but because of low reflux the overhead product from the column would not meet the hexane dilution test for soluble methylvinylpyridine polymer over a 12 to 15 hour period of operation. A mixture composed of 2 parts by weight ditertiary butyl polysulfide to 1 part tertiarybutyl catechol was dissolved in the feed stream and fed to the column. In one and one-half hours the overhead product was clear of soluble polymer. The overhead product moreover remained clear of soluble polymer even though the point of introduction of the combined inhibitor solution was raised to the top of the column packing.

The above runs show the effectiveness of the inhibitors mentioned in inhibiting polymer formation during distillation or fractionation of vinyl-substituted heterocyclic nitrogen compounds. Other modes of applying the principle of the invention can be employed within the scope of this invention instead of those explained, change being made as regards the method or compounds disclosed, provided the steps or compounds stated or the equivalents of such steps or compounds be employed.

I claim:

A process for purifying 2-methyl-5-vinylpyridine prepared by the catalytic dehydrogenation of 2-methyl-5-ethylpyridine which comprises combining the mixture of reaction products resulting from said dehydrogenation process with from 0.1 percent to 5 percent by weight based on 2-methyl-5-vinylpyridine in said mixture of a combination of an organic polysulfide corresponding to the formula $R'S_xR''$ wherein $R'$ and $R''$ are alkyl radicals, each alkyl radical having from 1 to 12 carbon atoms, and $x$ is an integer in the range from 3 to 5 with catechol, the ratio of polysulfide compound to catechol being from 4:1 to 1:1, fractionating said mixture containing said catechol-polysulfide mixture under vacuum, recovering as bottoms product 2-methyl-5-vinylpyridine containing polysulfide and catechol inhibitor, subsequently distilling said bottoms product in a final distillation column, and recovering at least 95 percent pure 2-methyl-5-vinylpyridine.

References Cited in the file of this patent
UNITED STATES PATENTS

| | | |
|---|---|---|
| 2,320,859 | Foord | June 1, 1943 |
| 2,373,754 | Fryling et al. | Apr. 17, 1945 |
| 2,407,861 | Wolk | Sept. 16, 1946 |
| 2,410,408 | Durland | Nov. 5, 1946 |
| 2,483,778 | Morrell et al. | Oct. 4, 1949 |
| 2,556,845 | Kauffman | June 12, 1951 |
| 2,574,020 | Crouch | Nov. 6, 1951 |
| 2,607,775 | Vinton | Aug. 19, 1952 |
| 2,611,769 | Hays | Sept. 23, 1952 |

OTHER REFERENCES

Frank: Journal of Amer. Chem. Soc., vol. 68, page 908 (1946).